US006899844B2

(12) United States Patent
Desaki et al.

(10) Patent No.: US 6,899,844 B2
(45) Date of Patent: May 31, 2005

(54) PRODUCTION METHOD OF ALUMINUM ALLOY FOR SLIDING BEARING

(75) Inventors: Toru Desaki, Aichi (JP); Soji Kamiya, Aichi (JP); Kazuaki Sato, Aichi (JP); Yukio Okouchi, Aichi (JP); Tetsuya Nukami, Aichi (JP)

(73) Assignees: Taiho Kogyo Co., Ltd., Toyota (JP); Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 10/406,392

(22) Filed: Apr. 4, 2003

(65) Prior Publication Data

US 2004/0022663 A1 Feb. 5, 2004

Related U.S. Application Data

(62) Division of application No. 09/841,034, filed on Apr. 25, 2001, now Pat. No. 6,706,126.

(51) Int. Cl.[7] .............................................. C22C 21/00
(52) U.S. Cl. .......................... 419/14; 419/17; 148/437; 420/554; 420/530
(58) Field of Search ............................ 75/10.18, 10.21; 419/14, 17; 420/554, 530; 148/437; 428/614

(56) References Cited

U.S. PATENT DOCUMENTS 5,336,291 A * 8/1994 Nukami et al. ............ 75/10.18

6,416,598 B1   7/2002 Sircar ......................... 148/688

FOREIGN PATENT DOCUMENTS

| JP | 63-83239 | 4/1988 |
|---|---|---|
| JP | 7-197148 | 8/1995 |
| JP | 2000-119791 | 4/2000 |
| JP | 2000-504376 | 4/2000 |
| WO | WO 98/22633 | 5/1998 |

OTHER PUBLICATIONS

"Aluminum and Aluminum Alloys", ASM International, 1993, pp 45,170–171.*

* cited by examiner

Primary Examiner—George Wyszomierski
Assistant Examiner—Janelle Morillo
(74) Attorney, Agent, or Firm—Armstrong, Kratz, Quintos, Hanson & Brooks, LLP

(57) ABSTRACT

A method of producing a fine TiC particle-dispersing type Al—Sn based aluminum alloy includes the steps of: preparing either Al mother-alloy or metallic raw materials of the Al alloy and a green compact, in which TiC is dispersed; melting the Al mother-alloy or the metallic raw materials of the Al alloy to form an Al alloy melt; bringing the Al alloy melt and the green compact, in which TiC is dispersed, into contact with one another, thereby dispersing the TiC in the Al-alloy melt; casting the Al alloy melt, in which TiC is dispersed, into an aluminum-alloy ingot, in which TiC is dispersed; and rolling the aluminum-alloy ingot.

4 Claims, 2 Drawing Sheets

PRODUCTION METHOD OF ALUMINUM ALLOY FOR SLIDING BEARING

This is a divisional of application Ser. No. 09/841,034, filed Apr. 25, 2001, now U.S. Pat. No. 6,706,126.

BACKGROUND OF INVENTION

1. Field of Invention

The present invention relates to an Al—Sn based aluminum-alloy for sliding bearing. More particularly, the present invention relates to an Al—Sn based aluminum-alloy exhibiting improved fatigue resistance at high-temperature region due to dispersion of fine particles, while maintaining the compatibility at a room-temperature region, when used as a sliding bearing. The present invention also relates to a production method of the Al—Sn based sliding bearing, in which fine particles are dispersed.

2. Description of Related Art

Aluminum alloy and copper alloy are two major materials of the sliding-bearing materials. Representative additive components of the aluminum alloy are Sn, Pb and the like, which impart the lubricating property and compatibility, as well as Si and the like which impart the wear resistance.

One means for enhancing the fatigue resistance of the aluminum alloy is to add such elements as Si, Cr, Cu and Mg in some extent as to utilize the precipitation hardening of these elements. The heat treatment for precipitation hardening is usually the solution heat-treatment followed by aging at room temperature ($T_4$) or artificial aging at approximately 150° C. ($T_6$) Another means for enhancing the fatigue resistance is to add such elements as Cu and Mg within the solubility limit and hence to utilize the solution strengthening. The heat treatment usually employed is the solution heat-treatment followed by aging at room temperature. ($T_4$)

The effects of solution strengthening method mentioned above are lost at elevated temperature. Both strength and hardness increase with the temperature increase from room temperature to somewhat high temperature in each case of solution strengthening and precipitation hardening. However, the compatibility, which is important for sliding bearing, deteriorates as strength and handness increase. Along with deterioration of compatibility, there arises danger of seizure and fatigue.

Various proposals have been made to improve the compositions of aluminum alloys described above. A proposal made by one of the present applicants and employed in actual machines is disclosed in German Patent DE 32 49 133 C2. The aluminum-alloy used for sliding bearing proposed in this patent is characterized in that hard particles of Si, Fe and the like having average particle diameter of from 4 to 5 μm are coarsely precipitated. The nodular cast iron of the opposed shaft is shaved by the coarse hard particles, thereby forming compatible bearing-surface and enhancing the bearing performance.

Similar proposal has been made by one of the present applicants and is disclosed in U.S. Pat. No. 4,153,756. The Al—Sn based sliding bearing proposed in the patent contains a small amount of Cr, and prevents the coarsening of the Sn particles due to the effects of Cr and hence the fatigue from occurring.

Meanwhile, it is known to apply the ceramic-particle dispersion strengthening to the aluminum-alloy (for example, Japanese Patent No. 2709097). The aluminum alloy, which is strengthened by the ceramic fine particles, is usually produced by the powder metallurgy method. This alloy is appropriate for the wear resistant parts. But can not meet sever compatibility which may be required for the sliding bearing.

It is also known to add the ceramic particles to molten aluminum-alloy. For example, the ceramic particles are added during the die casting (Japanese Patent No. 2739580). In Japanese Unexamined Patent Publication No. 6-17165, the ceramic particles fed into the melt from mother alloy. A green compact consisting of Ti powder, graphite powder and Al (alloy) powder is prepared and is then impregnated with the Al (alloy) melt, followed by heating to form TiC particles. The so treated green compact is used as the mother alloy of TiC.

When the ordinary aluminum alloy is compared with the composite ceramic-aluminum alloy, hardness at room temperature and compatibility of the former are lower and higher, respectively, than these of the latter. However, the hardness of the former abruptly drops at high temperature so that the fatigue resistance becomes unsatisfactory. On the other hand, since the latter is harder at high temperature than the former, the fatigue resistance of the latter is superior to that of the former. The compatibility of latter is poor due to high hardness at room temperature.

SUMMARY OF INVENTION

It is therefore an object of the present invention to provide an aluminum alloy which exhibits improved fatigue resistance at a high temperature region, while maintaining compatibility at low temperature not with standing improved fatigue resistance.

It is also an object of the present invention to provide a method for producing an aluminum alloy, which exhibits improved fatigue resistance at a high temperature region, while maintaining compatibility at low temperature not with standing improved fatigue resistance.

In accordance with the objects of the present invention, there is provided a fine-particle dispersion type Al—Sn based aluminum alloy, which consists of from 2 to 20% by weight of Sn, 3% by weight or less of Cu, and from 0.3 to 5% by volume of TiC particles, the balance being Al and unavoidable impurities.

There is also provided a sliding bearing comprising the fine-particle dispersion type Al—Sn based aluminum alloy mentioned above in the form of a lining.

There is also provided a method for producing a fine TiC particle-dispersing type Al—Sn based aluminum alloy comprising the steps of:

preparing either Al mother-alloy or metallic raw materials of the Al alloy and a green compact, in which TiC is dispersed;

melting the Al mother-alloy or the metallic raw materials of the Al alloy to form an Al alloy melt;

bringing the Al alloy melt and the green compact, in which TiC is dispersed, into contact with one another, thereby dispersing the TiC in the Al-alloy melt;

casting the Al-alloy melt, in which TiC is dispersed, into an aluminum-alloy ingot, in which TiC is dispersed; and, rolling the ingot. The present invention is described hereinafter in detail.

DESCRIPTION OF PREFERRED EMBODIMENTS

In the composition mentioned above, Sn is dispersed in the form of soft minority phase and realizes the compatibility. When the Sn amount is less than 2% by weight, the compatibility is unsatisfactory. On the other hand, when the Sn amount is more than 20% by weight, the strength of Al alloy is lowered. The Sn amount should, therefore, be from 2 to 20% by weight. The Sn amount is preferably from 2 to 12% by weight, more preferably form 2 to 8% by weight.

Cu strengthens the Al matrix due to solution-strengthening and makes the fatigue difficult to occur. When the Cu amount is more than 3% by weight, hardness becomes so high in a temperature range of from room temperature to the operating temperature of bearing that the compatibility is not maintained. The Cu amount is preferably 0.1% by weight or more, and more preferably from 0.1 to 2% by weight.

TiC particles enhance the high-temperature strength and fatigue strength due to dispersion-strengthening. Features of TiC particles from the viewpoint of compatibility are that: they have no compatibility for their self because of hard particles; since TiC particles are not precipitated from the Al matrix, no precipitation hardening occurs. Deterioration of compatibility due to the precipitation does not occur due to the TiC particles; and, the compatibility of TiC is relatively good among the hard particles because of lower hardness than the other hard particles.

Smaller average diameter of TiC particles is more preferable from the viewpoints of fatigue resistance and compatibility. Drawbacks become prominent when the average particle diameter is greater than 5 μm. When the TiC particles are less than 0.3% by volume, they are not very effective for enhancing the high-temperature strength. On the other hand, when the TiC particles are much more than 5% by volume, the compatibility is seriously lowered. Preferably, TiC particles have 2 μm or less of average particle diameter and is added by 3% by volume or less.

The effects of TiC particles to enhance the fatigue resistance become outstandingly high when they are dispersed, in the rolled product. The reasons for this seem to be the following (a) through (c). (a) The Sn particles and the TiC particles are close to one another in the rolled product. Judging from this fact, the coarsening of the Sn particles is prevented during the use of bearing due to the TiC particles. (b) Room-temperature hardness increase due to hard particles is smaller in the TiC composite material than in the composite materials of other ceramics. The compatibility of the former is better than that of the latter. (c) Dislocations introduced by the rolling become difficult to relief Reduction of strength at high temperature is, therefore, low.

The aluminum alloy according to the present invention may further contain 2% by weight or less in total of one or more elements selected from the group consisting of Mg, Cr, Zr, Mn, V, Ni and Fe. Among these elements, Mg is also solution-strengthening element as Cu. Its additive amount is 2% by weight or less. When the amount of Mg is more than 2% by weight, the alloy is too hardened to maintain the compatibility. Cr and the like other than Mg enhance the high-temperature hardness. Its or their additive amount is 2% by weight or less. When the additive amount is more than 2% by weight, the alloy is too hardened and coarse precipitates are formed. A preferable additive amount of Mg and the like is from 0.3 to 1.5% by weight in total.

The aluminum alloy according to the present invention may further contain 8% by weight or less of one or more selected from the group consisting of Pb, Bi and In. These elements form a soft phase alone or as an alloy with Sn and enhance the compatibility. However, when their additive amount is more than 8%, the strength of alloy is lowered. A preferable additive content of Pb and the like is 4% by weight and is more preferably 2% by weight or less.

A method for producing the aluminum alloy is now described.

At least one metallic raw-material such as Al alloys e.g., Al—Sn, Al—Cu and the like (hereinafter referred to as "Al mother-alloy") and a green compact, in which TiC is dispersed (hereinafter referred to as "TiC mother-alloy") are prepared, in such a manner that the entire composition provides the composite-alloy compositions described above. The Al mother-alloy and the TiC mother-alloy are brought into contact with one another, for example by a method adding the TiC mother alloy into the melt of the Al mother alloy. TiC is dispersed in the aluminum alloy ingot thus produced by melting. This ingot is preferably rolled. The above-described methods for adding the TiC-dispersing green compact into the melt enables to uniformly disperse TiC in the Al (alloy) melt. The TiC can be furthermore uniformly dispersed in the Al alloy by means of rolling. TiC may be mixed with any material such as Al, Al alloy, Cu and Cu alloy for producing a green compact. TiC and any one of these materials may be mixed and compacted by powder metallurgy method. The method disclosed in Japanese Unexamined Patent Publication No. 5-17165 mentioned above may also be used. TiC may not be added but may be formed by a reaction of Ti and graphite in the green compact.

Continuous casting or ingot casting may carry out to obtain an optional thickness.

Rolling is carried out by cold rolling. The draft in the rolling (reduction ratio of thickness) is from 20 to 50% per pass. The total draft from the ingot to the final product is preferably from 95 to 99%.

The rolled sheet has preferably the solution temper ($T_4$) but is not specifically limited.

The above described aluminum alloy according to the present invention can be used for the sliding or plain bearings having an ordinary structure. Among them a bi-metal type bearing, i.e., bonded aluminum-bearing alloy (the so-called lining) and backing metal, is included. The so-called solid bearing, in which the aluminum-bearing alloy is not bonded with the backing metal, is also included. In addition, also included is the bearing having a three-layer type structure, that is, an intermediate strengthening layer such as pure aluminum, Al—Cu, Al—Mg, Al—Mn based alloys, sandwiched between the backing metal and the lining.

Coating made of the solid lubricant $MoS_2$ and resin may be deposited on the surface of aluminum alloy in contact with the opposed shaft. The coating is preferably from 3 to 10 μm thick. $MoS_2$ is effective for preventing the seizure from occurring in the initial operation period of bearing. Such resin as polyimide and polyamid imide are preferably used as the resin. In addition, the amount of $MoS_2$ is preferably from 60 to 90% by weight.

When the coating mentioned above is worn out to some extent, the aluminum alloy is brought into contact with the shaft. Under this circumstance, the seizure and wear are prevented by inherent properties of the bearing alloy. This means that $MoS_2$ replaces the function of Sn to some extent The Sn amount of the aluminum alloy is, therefore, preferably from 2 to 8% by weight.

The following can generally be said. ① When the high-temperature strength is enhanced by dispersion strengthening, the fatigue strength is enhanced together. ② Hard-particle dispersion phase impairs the compatibility. Under this condition, the compatibility is difficult to be realized in the initial operation period of bearing. The compatible surface formed once is disordered by the hard-particle dispersion phase. The prevailing lubricating condition is boundary lubrication or solid lubrication. Wear is, therefore, likely to occur. This phenomenon exerts adverse effect on the fatigue resistance.

When the sliding bearing according to the present invention is used in an internal combustion engine operated at higher and higher temperature, the effect ① plays an important role. In the TiC-dispersed aluminum alloy, the deterioration of compatibility described in ② occurs but in slight extent. As a result, the present invention outstandingly enhances the fatigue resistance at high temperature and attains good compatibility at room temperature.

EXAMPLES

Example 1

The TiC mother-alloy was produced by the following method. The percentage is based on weight unless otherwise specified.

Ti powder (product of Sumitomo Systics, −325 mesh) in 1 g, graphite powder (product of AESAR, −325 mesh) in 0.2 g and pure Al powder (product of Toyo Aluminium, −100 mesh) in 0.5 g were weighed and mixed with one another. The resultant powder mixture was shaped by a metal-die compacting method under surface pressure of 4 tons into a cylindrical compact 11.3 mm in diameter and 5 mm. The resultant green compact was dipped in the pure Al melt (temperature-780° C.) for 30 seconds. The green compact was withdrawn from the melt and solidified in such a manner to avoid red heating. The resultant impregnated compact was heated to 1200° C. in the Ar gas protective atmosphere at heating rate of 5° C./minute. The heating was then stopped and the non-forced cooling was then carried out in the Ar gas protective atmosphere. The pellets (TiC mother-alloy) was thus obtained.

The Al mother alloy having composition of 4.5% of Sn, 1.7% of Cu, the balance being Al was prepared by the ordinary melting method. The Al mother-alloy was melted in a low-frequency furnace, and the TiC mother-alloy was dropped into the Al-alloy melt to dissolve the TiC mother melt. Then, the holding was carried out for 20 minutes to uniformly disperse TiC fine particles in the melt. The melt was continuously cast at 800° C. into sheet thickness of 18 mm. Two-stage cold rolling and intermediate annealing at 350° C. were carried out to obtain a 1.1 mm thick rolled sheet of product. The composition of the rolled sheet was 4% of Sn, 1.5% of Cu, 2.2% by volume of TiC (average particle diameter of 1 $\mu$m), and the balance of Al.

The Al-alloy rolled sheet and a 2.4 mm thick mild-steel sheet were pressure bonded by the ordinary method in the form of bi-metal. The bi-metal specimens were subjected to the fatigue test under the following conditions.

Figure 1:
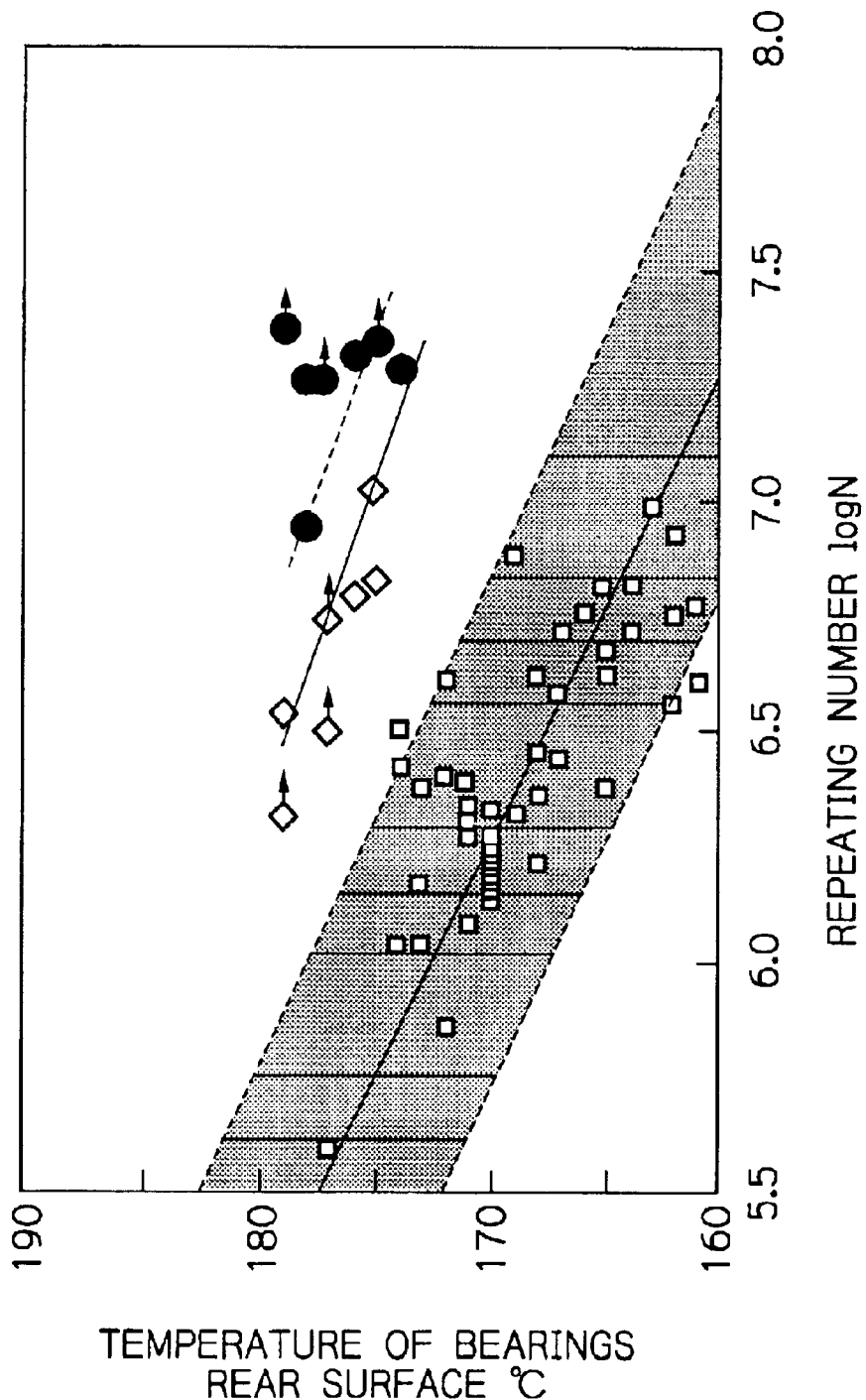
FIG. 1 is a graph showing the results of fatigue test carried out in Example 1 and Comparative Example 1
Figure 2:
FIG. 2 is microscope photograph of the aluminum alloy for sliding bearing according to the present invention.

Conditions of Fatigue Test (a) Tester: rotational load tester
(b) Rotation number: 8000 rpm
(c) Testing temperature (temperature of backing surface of bearing): 160–183° C.
(d) Surface pressure: 29 MPa
(e) Opposite Material: Quenched S55C
(f) Lubricating oil: 5w-30SH The results of test are shown in FIG. 1. The 50 $\mu$m thick surface of Sample No. 4 of Example 2 was removed by polishing. The surface structure of the so polished surface is shown in FIG. 2. As shown in this photograph, the Sn minority phase is elongated in the rolling direction.

Comparative Example

The Al alloy, the composition of which is 12% of Sn, 1.0% of Cu, 2.7% of Si, and the balance of Al, was worked and heat-treated by the same method as in the German patent mentioned above (page 11 of Gazette, Table 2). The obtained product was used as the comparative specimen. It was pressure bonded on the same backing steel sheet as in Example and was subjected to the same fatigue-resistance test as in Example 1. The results are shown in FIG. 1 as well.

Example 2

The specimens having composition as shown in Table 1 were tested under the testing conditions of Example 1 except for the constant temperature of 175° C. As shown in Table 1, either the fatigue resistance or the seizure resistance deteriorates when one of the Sn amount, the Cu amount, the TiC additive amount and the average particle diameter of TiC fall outside the inventive range. Referring to FIG. 2, the amount of TiC particles in the vicinity of the Sn minority phase is small, because Sample No. 4 has small additive amount of TiC.

Example 3

The materials having composition shown in Table 2 were tested by the same method as in Example 1. The obtained repeating number is shown in Table 2. The fatigue resistance can be outstandingly enhanced by means of dispersion-strengthening by TiC fine particles, while maintaining the compatibility at good level.

TABLE 1

| | | | | TiC Particles | | | |
|---|---|---|---|---|---|---|---|
| No | Al | Sn | Cu | Added Amount (Vol. %) | Average Particle Diameter ($\mu$m) | Repeating Cycles logN | Remarks |
| 1 | Balance | 25 | 1.5 | 2 | 2 | 6.8 | Comparative |
| 2 | Balance | 15 | 5 | 2 | 2 | Seizure | Comparative |
| 3 | Balance | 15 | 2 | 15 | 2 | Seizure | Comparative |
| 4 | Balance | 15 | 2. | 2 | 7 | 6.3 | Comparative |
| 5 | Balance | 4 | 1.5 | 0 | — | 6.8 | Comparative |
| 6 | Balance | 12 | 1 | 0 | — | 5.8 | Comparative |
| 7 | Balance | 4 | 1.5 | 2 | — | 7.4 | Inventive |
| 8 | Balance | 8 | 0.5 | 3 | — | 7.7 | Inventive |
| 9 | Balance | 2 | 1 | 0.5 | 0.5 | 7.3 | Inventive |
| 10 | Balance | 15 | 1 | 2 | 2 | 7.5 | Inventive |
| 11 | Balance | 8 | 0.5 | 5 | 5 | 7.3 | Inventive |

TABLE 2

| | Al Alloy Composition (wt %) | | | | | | | | | | | | | TiC Added Amount | TiC Average Particle Diameter | Repeating Cycles logN |
|---|---|---|---|---|---|---|---|---|---|---|---|---|---|---|---|---|
| | Al | Sn | Cu | Cr | Zr | Mg | Mn | V | Ni | Fe | Pb | Bi | In | | | |
| 12 | Bal | 4 | 1.5 | 0.15 | — | — | — | — | — | 0.2 | — | — | — | 8 | 2 | 7.6 |
| 13 | Bal | 8 | 1 | — | 0.2 | — | — | — | — | 0.1 | 2 | — | — | 1 | 2 | 7.5 |
| 14 | Bal | 12 | 0.5 | — | — | 1 | — | — | — | — | — | 1 | — | 3 | 0.5 | 7.8 |
| 15 | Bal | 4 | 1 | — | — | — | 0.2 | 0.1 | — | 0.2 | 1 | — | — | 2 | 2 | 7.6 |
| 16 | Bal | 15 | 1 | — | — | — | — | — | 0.2 | 0.2 | — | — | 1 | 5 | 0.5 | 7.7 |

What is claimed is:

1. A method for producing a fine TiC particle-dispersing type Al—Sn based aluminum alloy comprising the steps of:

preparing either Al mother-alloy or metallic raw materials of the Al alloy and a green compact, in which TiC is dispersed;

melting the Al mother-alloy or the metallic raw materials of the Al alloy to form an Al alloy melt;

bringing the Al alloy melt and the green compact, in which TiC is dispersed, into contact with one another, thereby dispersing the TiC in the Al-alloy melt;

casting the Al-alloy melt, in which TiC is dispersed, into an aluminum-alloy ingot, in which TiC is dispersed; and, rolling the aluminum-alloy ingot wherein said Al mother-alloy or metallic raw materials and said green compact are prepared in such a manner that the entire composition consists of from 2 to 20% by weight of Sn, 3% by weight or less of Cu, and from 0.3 to 5% by volume of TiC particles, the balance being Al and unavoidable impurities.

2. A method for producing a fine TiC particle-dispersing tyne Al—Sn based aluminum alloy comprising the steps of:

preparing either Al mother-alloy or metallic raw materials of the Al alloy and a green compact, in which TiC is dispersed;

melting the Al mother-alloy or the metallic raw materials of the Al alloy to form an Al alloy melt;

bringing the Al alloy melt and the green compact, in which TiC is dispersed, into contact with one another, thereby dispersing the TiC in the Al-alloy melt;

casting the Al-alloy melt, in which TiC is dispersed, into an aluminum-alloy ingot, in which TiC is dispersed; and, rolling the aluminum-alloy ingot, wherein said Al mother-alloy or metallic raw materials and said green compact are prepared in such a manner the entire composition consists of from 2 to 20% by weight of Sn, 3% by weight or less of Cu, and from 0.3 to 5% by volume of TiC particles, and 2% by weight or less of at least one element selected from the group consisting of Mg, Cr, Zr, Mn, V, Ni and Fe, the balance being Al and unavoidable impurities.

3. A method for producing a fine TiC particle-dispersing type Al—Sn based aluminum alloy comprising the steps of:

preparing either Al mother-alloy or metallic raw materials of the Al alloy and a green compact, in which TiC is dispersed;

melting the Al mother-alloy or the metallic raw materials of the Al alloy to form an Al alloy melt;

bringing the Al alloy melt and the green compact, in which TiC is dispersed, into contact with one another, thereby dispersing the TiC in the Al-alloy melt;

casting the Al-alloy melt, in which TiC is dispersed, into an aluminum-alloy ingot, in which TiC is dispersed; and, rolling the aluminum-alloy ingot, wherein said Al mother-alloy or metallic raw materials and said green compact are prepared in such a manner the entire composition consists of from 2 to 20% by weight of Sn, 3% by weight or less of Cu, and from 0.3 to 5% by volume of TiC particles, and 8% by weight or less of at least one element selected from the group consisting of Pb, Bi and In, the balance being Al and unavoidable impurities.

4. A method for producing a fine TiC particle-dispersing type Al—Sn based aluminum alloy comprising the steps of:

preparing either Al mother-alloy or metallic raw materials of the Al alloy and a green compact, in which TiC is dispersed;

melting the Al mother-alloy or the metallic raw materials of the Al alloy to form an Al alloy melt;

bringing the Al alloy melt and the green compact, in which TiC is dispersed, into contact with one another, thereby dispersing the TiC in the Al-alloy melt;

casting the Al-alloy melt, in which TiC is dispersed, into an aluminum-alloy ingot, in which TiC is dispersed; and, rolling the aluminum-alloy ingot, wherein said Al mother-alloy or metallic raw materials and said green compact are prepared in such a manner the entire composition consists of from 2 to 20% by weight of Sn, 3% by weight or less of Cu, and from 0.3 to 5% by volume of TiC particles, 2% by weight or less of at least one element selected from the group consisting of Mg, Cr, Zr, Mn, V, Ni and Fe, and 8% by weight of less of at least one element selected from the group consisting of Pb, Bi and In, the balance being Al and unavoidable impurities.

* * * * *